United States Patent [19]

Ogawa et al.

[11] Patent Number: 4,719,045

[45] Date of Patent: Jan. 12, 1988

[54] FLAME RETARDANTS FOR POLYOLEFINS

[75] Inventors: Yoshikatsu Ogawa, Takatsuki; Haruhiko Hisada, Yao; Takeshi Kasahara, Sakai; Fumihiko Kizaki, Kaizuka; Masahide Yoshiya, Fujiidera, all of Japan

[73] Assignee: Marubishi Yuka Kogyo Kabushiki Kaisha, Osaka, Japan

[21] Appl. No.: 850,743

[22] Filed: Apr. 11, 1986

[51] Int. Cl.$^4$ .................... C09K 21/00; C07D 251/00
[52] U.S. Cl. .................................. 252/609; 252/606; 260/DIG. 24; 521/907; 524/582; 524/583; 524/585; 544/195; 544/196; 544/197; 544/214
[58] Field of Search ................ 252/609, 601, 610–611, 252/606; 260/DIG. 24; 521/85, 907, 908; 524/100, 583, 585, 581, 582; 544/194, 195, 196, 197, 200, 214

[56] References Cited

U.S. PATENT DOCUMENTS

| | | | |
|---|---|---|---|
| 3,810,862 | 5/1974 | Mathis et al. | 252/609 |
| 3,931,101 | 1/1976 | Dany et al. | 524/80 |
| 3,943,194 | 3/1976 | Dany et al. | 524/416 |
| 4,043,987 | 8/1977 | Jolicoeur et al. | |
| 4,137,199 | 1/1979 | Brown et al. | 521/103 |
| 4,198,493 | 4/1980 | Marciandi | 525/164 |
| 4,265,806 | 5/1981 | Grundmann et al. | 252/606 |
| 4,341,694 | 7/1982 | Halpern | 252/606 |
| 4,404,297 | 9/1983 | Fishler et al. | 521/85 |
| 4,515,632 | 5/1985 | Maurer et al. | 525/164 |
| 4,542,170 | 9/1985 | Hall et al. | 524/377 |
| 4,579,894 | 4/1986 | Bertelli et al. | 524/416 |

FOREIGN PATENT DOCUMENTS 0106248  5/1985  European Pat. Off. .
2403357  4/1979  France .

Primary Examiner—Stephen J. Lechert, Jr.
Assistant Examiner—Howard J. Locker
Attorney, Agent, or Firm—Burgess, Ryan & Wayne

[57] ABSTRACT

A flame retardant for polyolefins, which comprises as an effective ingredient a hardly water-soluble or water-insoluble, nitrogen-containing phosphorus compound obtained by mixing 100 parts by weight of a condensed phosphoric acid compound with 10 to 100 parts by weight of a triazine compound and heating the mixture at 100° to 250° C. in the presence or absence of water.

6 Claims, No Drawings

FLAME RETARDANTS FOR POLYOLEFINS

BACKGROUND OF THE INVENTION

1. Field of the Invention

The present invention relates to a flame retardant for polyolefins. More particularly, the present invention relates to a halogen-free flame retardant for polyolefins.

2. Description of the Related Art

Polyolefins are light and have high strength, and have excellent water resistance, chemical resistance and electrically insulating properties and can be easily molded and processed. Accordingly, polyolefins are widely used as materials of electric appliances, automobile parts and construction materials.

However, polyolefins are defective in that they are easily combustible. Therefore, various processes for rendering polyolefins flame-retardant have been proposed. Among these processes, there is most popularly adopted a process in which an organic bromine compound or organic chlorine compound and antimony trioxide are added to a polyolefin. As the organic bromine or chlorine compound, there can be mentioned, for example, decabromodiphenyl oxide, a bisdibromopropyl ether of tetrabromobisphenolsulfone, a bisdibromopropyl ether of tetrabromobisphenol A, tris-2,3-dibromopropyl isocyanurate and a Diels-Alder reaction product of hexachlorocyclopentadiene. Furthermore, there have been proposed various other processes, for example, a process in which a metal hydroxide is added as disclosed in Japanese Unexamined Patent Publication Nos. 50-34643, 50-133247 and 51-128194, a process in which a metal hydroxide and ammonium polyphosphate are used in combination as disclosed in Japanese Unexamined Patent Publication No. 54-22450, a process in which melamine is added as disclosed in Japanese Unexamined Patent Publication Nos. 54-15952 and 56-103233, a process in which ammonium polyphosphate and a melamine-formalin resin are used in combination as disclosed in Japanese Unexamined Patent Publication No. 55-129435, and a process in which an inorganic compound is added.

When a halogen compound is used, since a hydrogen halide is formed by thermal decomposition, a mold or the like is easily corroded at the molding step. Furthermore, when a fire takes place, evacuation is inhibited by an irritating smell, and at the time of incineration, a stimulative smell is generated or an incinerator is corroded. When an inorganic compound such as ammonium polyphosphate or a metal hydroxide is used, since the flame-retardant effect is low, it is necessary to add such an inorganic compound in a large quantity. If the inorganic flame retardant is incorporated in a large quantity, the specific gravity of the polyolefin is increased and the strength, especially the impact resistance, is degraded.

SUMMARY OF THE INVENTION

It is a primary object of the present invention to eliminate the foregoing defects of the conventional techniques and provide a flame retardant for polyolefins, which does not generate an irritating gas or corrosive gas of a hydrogen halide at the molding step or at the time of incineration and shows an excellent flame-retardant effect.

In accordance with the present invention, there is provided a flame retardant for polyolefins, which comprises as an effective ingredient a hardly water-soluble or water-insoluble, nitrogen-containing phosphorus compound obtained by mixing 100 parts by weight of a condensed phosphoric acid compound represented by the following general formula (I):

wherein n is a number of at least 20, and $A_1$, $A_2$ and $A_3$, which may be the same or different, stand for H, $NH_4$ or $CONH_2$, with the proviso that the case where all of $A_1$, $A_2$ and $A_3$ simultaneously stand for H or $CONH_2$ is excluded, with 10 to 100 parts by weight, preferably 20 to 80 parts by weight, of a triazine compound represented by the following general formula (II):

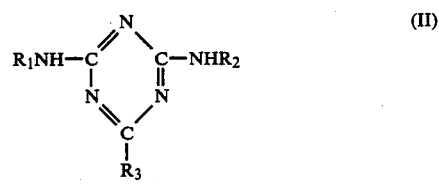

wherein $R_1$ and $R_2$, which may be the same or different, stand for H or $CH_2OH$ and $R_3$ stands for $NH_2$, $NH-CH_2OH$ or a phenyl group,
and heating the mixture at 100° to 250° C., preferably 150° to 250° C., in the presence or absence of water.

DESCRIPTION OF THE PREFERRED EMBODIMENTS

In the production of the nitrogen-containing phosphorus compound used in the present invention, if a condensed phosphoric acid compound of the general formula (I) in which n is smaller than 20 is used, it often happens that the obtained nitrogen-containing phosphorus compound becomes water-soluble, and good results cannot be obtained.

The triazine compound represented by the general formula (II) is added in an amount of 10 to 100 parts by weight per 100 parts by weight of the compound represented by the general formula (I). If the amount of the triazine compound (II) is smaller than 10 parts by weight or larger than 100 parts by weight per 100 parts by weight of the condensed phosphoric acid compound (I), the flame-retardant effect of the obtained nitrogen-containing phosphorus compound is insufficient, and good results cannot be obtained.

As typical instances of the condensed phosphoric acid compound of the general formula (I), there can be mentioned ammonium polyphosphates, ammonium carbamylpolyphosphates and compound prepared at a temperature higher than 200° C. according to the process disclosed in Japanese Examined Patent Publication No. 47-42640.

As typical instances of the triazine compound of the general formula (II), there can be mentioned melamine, monomethylolmelamine, dimethylolmelamine, trimethylolmelamine, 2,4-diamino-6-phenyltriazine, monomethylol-2,4-diamino-6-phenyltriazine and dimethylol-2,4-diamino-6-phenyltriazine.

As the polyolefin for which the flame retardant of the present invention is effectively used, there can be mentioned homopolymers of olefins such as ethylene, propylene, butene-1 and pentene-1, mixtures of two or more of these homopolymers, and copolymers of two or more of the foregoing olefins. It is preferred that the flame retardant of the present invention be incorporated in an amount of 3 to 50% by weight, especially 10 to 40% by weight, based on the total amount of the polyolefin composition.

The hardly water-soluble or water-insoluble, nitrogen-containing phosphorus compound, which is effectively used in the present invention, can be obtained by adding a triazine compound of the general formula (II) to a commercially available condensed phosphoric acid compound such as carbamyl polyphosphate or ammonium polyphosphate, and after addition of water or without addition of water, heating the mixture at 100° to 250° C., preferable 150° to 250° C., for 10 to 120 minutes. The obtained compound is then cooled, pulverized and used. The pulverization may be carried out according to a customary method using a hammer mill or feather mill, and the pulverization product is classified through a sieve having a mesh size of about 100 mesh and is then used. When the flame retardant having a large particle size is used, the physical properties of the resulting flame-retardant polyolefin are degraded and the flame retardancy is often reduced. However, if the particle size is about 100 mesh or smaller, such problems do not arise. More finely divided particles can also be used.

The structure of the nitrogen-containing phosphorus compound obtained by heating the condensed phosphoric acid compound of the general formula (I) and the triazine compound of the general formula (II) at 100° to 250° C. according to the present invention has not been completely elucidated. However, since $NH_3$ is generated during heating, it is presumed that $-ONH_4$ and $-OCONH_2$ of the condensed phosphoric acid compound such as ammonium polyphosphate or ammonium carbamylpolyphosphate participate mainly in the reaction and by a certain reaction of these groups with the triazine compound of the general formula (II), there is formed a hardly water-soluble or water-insoluble, nitrogen-containing phosphorus compound. Also when ammonium polyphosphate or ammonium carbamylpolyphosphate alone is heated, $NH_3$ is generated. In this case, however, formation of $NH_3$ is due to thermal decomposition and polyphosphoric acid is formed. Accordingly, in this case, even a hardly water-soluble condensed phosphoric acid compound is rendered water-soluble by heating.

A known mix-kneading method be utilized for incorporating the flame retardant of the present invention into a polyolefin. More specifically, the nitrogen-containing phosphorus compound is incorporated into a polyolefin powder or pellet and the mixture is kneaded by using a kneader, a mixing roll or an extruder.

A polyolefin composition comprising the flame retardant of the present invention can be molded into molded articles having various shapes, for example, plates, tubes, pipes, films, tapes, ribbons, fibers, and composite materials. There molded articles may be used for electric appliances, automobile parts, interior articles, construction materials, textile materials, daily necessaries and the like.

The present invention will now be described in detail with reference to the following non-limitative examples

PRODUCTION EXAMPLE 1

To 100 parts by weight of ammonium carbamylpolyphosphate (Non-nen W-3 supplied by Marubishi Yuka, average polymerization degree of about 120, phosphorus content of 31.2%, nitrogen content of 14.5%; about 85% of total nitrogen being nitrogen of $p\text{-}ONH_4$ and about 15% of total nitrogen being nitrogen of $p\text{-}OCONH_2$) was added 50 parts by weight of powdery melamine, and they were uniformly mixed. Then, 100 parts by weight of water was added to the mixture. The mixture was heated in an oven maintained at 220° to 225° C. for 45 minutes. The reaction product was cooled, pulverized and passed through a 100-mesh sieve.

PRODUCTION EXAMPLE 2

To 100 parts by weight of the same ammonium carbamylpolyphosphate as used in Production Example 1 were added 40 parts by weight of powdery melamine, 50 parts by weight of a 50% aqueous solution of trimethylolmelamine and 30 parts by weight of water, and they were uniformly mixed. The mixture was heated in an oven maintained at 220° to 250° C. for 60 minutes. The reaction product was cooled, pulverized and passed through a 100-mesh sieve.

PRODUCTION EXAMPLE 3

To 100 parts by weight of the same ammonium carbamylpolyphosphate as used in Production Example 1 were added 40 parts by weight of 2,4-diamino-6-phenyltriazine, 20 parts by weight of a 50% aqueous solution of trimethylolmelamine and 100 parts by weight of water, and the mixture was heated in an oven maintained at 210° to 215° C. for 45 minutes. Then, the reaction product was cooled, pulverized and passed through a 100-mesh sieve.

PRODUCTION EXAMPLE 4

To 100 parts by weight of commercially available ammonium polyphosphate (Sumisafe P supplied by Sumitomo Kagaku, average polymerization degree of about 150, phosphorus content of 31.6%, nitrogen content of 15.5%) was added 60 parts by weight of powdery melamine, and they were uniformly mixed. Then, 50 parts by weight of water was further added to the mixture, and the resulting mixture was heated in an oven maintained at 200° to 225° C. for 45 minutes. Then, the reaction product was cooled, pulverized and passed through a 100-mesh sieve.

PRODUCTION EXAMPLE 5

According to the process disclosed in Japanese Examined Patent Publication No. 47-42640, 93.6 parts by weight of 89% phosphoric acid and 60 parts by weight of urea were gradually heated, and when the temperature was elevated to 170° C., 60 parts by weight of powdery melamine and 20 parts by weight of 2,4-diamino-6-phenyltriazine were added to the reaction mixture and the resulting mixture was heated in an oven maintained at 220° to 225° C. for 60 minutes. Then, the reaction product was cooled, pulverized and passed through a 100-mesh sieve.

In the application examples given hereinafter, the flame retardancy characteristics were evaluated by the vertical test of UL-94 (Underwriters Laboratories Inc., USA) and by measuring the oxygen index according to the method of JIS K-7201.

APPLICATION EXAMPLE 1

A commercially available polypropylene pellet was kneaded with the nitrogen-containing phosphorus compound obtained in the Production Example at 150° to 160° C. for 20 minutes by using a mixing roll, and the kneaded mixture was hot-pressed under a pressure of 100 kg/cm$_2$ for 5 minutes to obtain a plate having a thickness of 3.0 mm. The flame retardancy characteristics were evaluated. The obtained results are shown in Table 1.

For comparison, the condensed phosphoric acids and powdery triazine compounds used in the Production Examples were similarly tested. The obtained results are shown in Table 1.

TABLE 1

| | Combustion Test | | | |
|---|---|---|---|---|
| | UL-94 | | Oxygen Index | |
| Content of Flame Retardant | 20% by weight | 30% by weight | 20% by weight | 30% by weight |
| Compound of Production Example 1 | V-2 | V-0 | 23.5 | 29.1 |
| Compound of Production Example 2 | V-2 | V-0 | 23.5 | 29.8 |
| Compound of Production Example 3 | V-2 | V-0 | 23.2 | 27.5 |
| Compound of Production Example 4 | V-2 | V-0 | 23.5 | 28.5 |
| Compound of Production Example 5 | V-2 | V-0 | 23.5 | 28.0 |
| Comparison | | | | |
| Carbamyl Polyphosphate | disqualified | disqualified | 19.5 | 22.0 |
| Ammonium Polyphosphate | disqualified | disqualified | 19.3 | 21.7 |
| Melamine | disqualified | disqualified | 19.5 | 22.0 |
| 2,4-Diamino-6-phenyltriazine | disqualified | disqualified | 19.0 | 21.5 |
| No Flame Retardant | disqualified | | 18.5 | |

APPLICATION EXAMPLE 2

A plate having a thickness of 3.0 mm was prepared from a pellet of a commercially available propylene copolymer (propylene/ethylene copolymer) according to the same method as described in Application Example 1. The flame retardancy characteristics were similarly evaluated. The obtained results are shown in Table 2.

TABLE 2

| | Combustion Test | | | |
|---|---|---|---|---|
| | UL-94 | | Oxygen Index | |
| Content of Flame Retardant | 20% by weight | 30% by weight | 20% by weight | 30% by weight |
| Compound of Production Example 1 | V-2 | V-0 | 23.2 | 28.5 |
| Compound of Production Example 2 | V-2 | V-0 | 23.0 | 29.5 |
| Compound of Production Example 3 | V-2 | V-0 | 23.0 | 27.5 |
| Compound of Production Example 4 | V-2 | V-0 | 23.5 | 28.5 |
| Compound of Production Example 5 | V-2 | V-0 | 23.5 | 28.0 |
| Comparison | | | | |
| Carbamyl Polyphosphate | disqualified | disqualified | 19.5 | 22.3 |
| Ammonium Polyphosphate | disqualified | disqualified | 19.3 | 21.1 |
| Melamine | disqualified | disqualified | 19.5 | 22.0 |
| 2,4-Diamino-6-phenyltriazine | disqualified | disqualified | 19.0 | 21.2 |
| No Flame Retardant | disqualified | | 18.3 | |

APPLICATION EXAMPLE 3

A plate having a thickness of 3.0 mm was prepared from a commercially available polyethylene pellet according to the same method as described in Application Example 1. The flame retardancy characteristics were evaluated. The obtained results are shown in Table 3.

TABLE 3

| | Combustion Test | | | |
|---|---|---|---|---|
| | UL-94 | | Oxygen Index | |
| Content of Flame Retardant | 30% by weight | 40% by weight | 30% by weight | 40% by weight |
| Compound of Production Example 1 | V-2 | V-0 | 24.8 | 28.5 |
| Compound of Production Example 2 | V-2 | V-0 | 23.8 | 27.5 |
| Compound of Production Example 3 | V-2 | V-0 | 23.1 | 27.5 |
| Compound of Production Example 4 | V-2 | V-0 | 23.0 | 28.0 |
| Compound of Production Example 5 | V-2 | V-0 | 23.5 | 28.0 |
| Comparison | | | | |
| Carbamyl Polyphosphate | disqualified | disqualified | 19.2 | 22.3 |
| Ammonium Polyphosphate | disqualified | disqualified | 19.0 | 22.0 |
| Melamine | disqualified | V-2 | 19.4 | 23.0 |
| 2,4-Diamino-6-phenyltriazine | disqualified | disqualified | 19.0 | 21.3 |
| No Flame Retardant | disqualified | | 18.3 | |

We claim:

1. A flame retardant for polyolefins, which comprises as an effective ingredient a hardly water-soluble or water-insoluble, nitrogen-containing phosphorus compound obtained by mixing 100 parts by weight of a condensed phosphoric acid compound represented by the following general formula (1):

wherein n is a number of at least 20, and $A_1$, $A_2$ and $A_3$, which may be the same or different, stand for H, $NH_4$ or $CONH_2$, with the proviso that the case where all of $A_1$, $A_2$ and $A_3$ simultaneously stand for H or $CONH_2$ is excluded, with 10 to 100 parts by weight of a triazine compound represented by the following general formula (II):

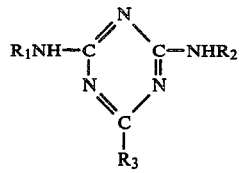
(II)

wherein $R_1$ and $R_2$, which may be the same or different, stand for H or $CH_2OH$ and $R_3$ stands for $NH_2$, $NH-CH_2OH$ or a phenyl group, and heating the mixture at 100° to 200° C. in the presence or absence of water.

2. A flame retardant as set forth in claim 1, wherein the amount of the triazine compound is 20 to 80 parts by weight.

3. A flame retardant as set forth in claim 1, wherein the mixture is heated at 150° to 250° C.

4. A flame retardant as set forth in claim 1, wherein the condensed phosphoric acid compound is selected from ammonium polyphosphates and ammonium carbamylpolyphosphates.

5. A flame retardant as set forth in claim 1, wherein the triazine compound is selected from melamine, monomethylolmelamine, dimethylolmelamine, trimethylolmelamine, 2,4-diamino-6-phenyltriazine, monomethylol-2,4-diamino-6-phenyltriazine and dimethylol-2,4-diamino-6-phenyltriazine.

6. A flame retardant as set forth in claim 1, which is in a particulate form having a particle size of about 100 mesh or smaller.

* * * * *